United States Patent
Tai et al.

(10) Patent No.: US 10,101,765 B2
(45) Date of Patent: Oct. 16, 2018

(54) BIOS REAL-TIME CLOCK UPDATE

(71) Applicant: HEWLETT-PACKARD DEVELOPMENT COMPANY, L.P., Houston, TX (US)

(72) Inventors: Jen-Hao Tai, Taipei (TW); Chien Kun Wang, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/309,519

(22) PCT Filed: Jul. 25, 2014

(86) PCT No.: PCT/US2014/048099
§ 371 (c)(1),
(2) Date: Nov. 8, 2016

(87) PCT Pub. No.: WO2016/014069
PCT Pub. Date: Jan. 28, 2016

(65) Prior Publication Data
US 2017/0185101 A1    Jun. 29, 2017

(51) Int. Cl.
*G06F 1/14* (2006.01)
*G06F 11/30* (2006.01)
*G01R 31/36* (2006.01)
*G04C 10/04* (2006.01)
*G06F 9/38* (2018.01)
*G06F 11/16* (2006.01)
*G06F 1/04* (2006.01)

(52) U.S. Cl.
CPC ............ *G06F 1/14* (2013.01); *G01R 31/3655* (2013.01); *G04C 10/04* (2013.01); *G06F 9/3869* (2013.01); *G06F 11/1604* (2013.01); *G06F 11/1679* (2013.01); *G06F 11/3075* (2013.01); *G06F 1/04* (2013.01)

(58) Field of Classification Search
CPC ....... G01R 31/3655; G04C 10/04; G06F 1/04; G06F 1/14; G06F 11/1679; G06F 11/3075; G06F 9/3869
See application file for complete search history.

(56) References Cited

U.S. PATENT DOCUMENTS

| 5,542,077 A * | 7/1996 | Johnson .............. G06F 11/1417 713/300 |
| 7,930,527 B2 | 4/2011 | Matsuoka et al. |
| 2002/0043955 A1* | 4/2002 | Hansford .............. H02J 7/0004 320/106 |
| 2003/0115001 A1 | 6/2003 | Odaohhara |

(Continued)

FOREIGN PATENT DOCUMENTS

EP    0616281 A2    9/1994

OTHER PUBLICATIONS

Jinrong Qian and Michael Vega, "Host-side Gas-guage-system Design Considerations for Single-cell Handheld Applications," Oct. 19, 2007, pp. 12-15 and Notice (1 page) Analog Applications Journal 4O 2007 Texas Instruments Incorporated.

*Primary Examiner* — Terrell S Johnson
(74) *Attorney, Agent, or Firm* — Dhand Law PC

(57) ABSTRACT

An example system includes a bask input/output system (BIOS) and a battery having a fuel gauge timer. The BIOS is associated with a real-time clock, and the BIOS uses timer information from the fuel gauge timer to update the real-time clock.

13 Claims, 2 Drawing Sheets

(56) References Cited

U.S. PATENT DOCUMENTS

| | | | |
|---|---|---|---|
| 2008/0104409 A1* | 5/2008 | Matsuoka | G06F 21/32 |
| | | | 713/178 |
| 2011/0302441 A1 | 12/2011 | Sawyers | |
| 2011/0314322 A1 | 12/2011 | Shao | |
| 2012/0275101 A1 | 11/2012 | Johnson et al. | |
| 2012/0327749 A1 | 12/2012 | Tsukamoto et al. | |
| 2013/0232373 A1 | 9/2013 | Wang et al. | |
| 2014/0095897 A1 | 4/2014 | Ji et al. | |
| 2014/0163910 A1 | 6/2014 | Yu et al. | |
| 2016/0378135 A1* | 12/2016 | Larson | G06F 1/14 |
| | | | 713/2 |

* cited by examiner

BIOS REAL-TIME CLOCK UPDATE

BACKGROUND

Real-time clock information is maintained for devices such as computers, including information such as time and date. Real-time clock is typically maintained within and/or used by a computer's basic input/output system (BIOS). Various applications installed on the computer may use the real-time clock.

BRIEF DESCRIPTION OF THE DRAWINGS

For a more complete understanding of various examples, reference is now made to the following descriptions taken in connection with the accompanying drawings in which.

DETAILED DESCRIPTION

Various examples described below provide for updating of a real-time clock for a device, such as a computer. The real-time clock uses information from a fuel gauge of a battery to update the timer information. The fuel gauge of a battery is provided with circuitry for a timer. A controller, such as the central processing unit (CPU) of the device, can obtain the timer information from the fuel gauge of the battery upon boot up of the device. The basic input/output system (BIOS) of the device can obtain the timer information from the fuel gauge and update the real-time clock of the device. Thus, in accordance with various examples, the real-time clock of the device does not need to be powered when the device is shut down, eliminating the need for a coin battery, for example. In some examples, the timer information from the fuel gauge of the battery may be used to supplement, synchronize or otherwise provide timer information to the real-time clock.

Figure 1:
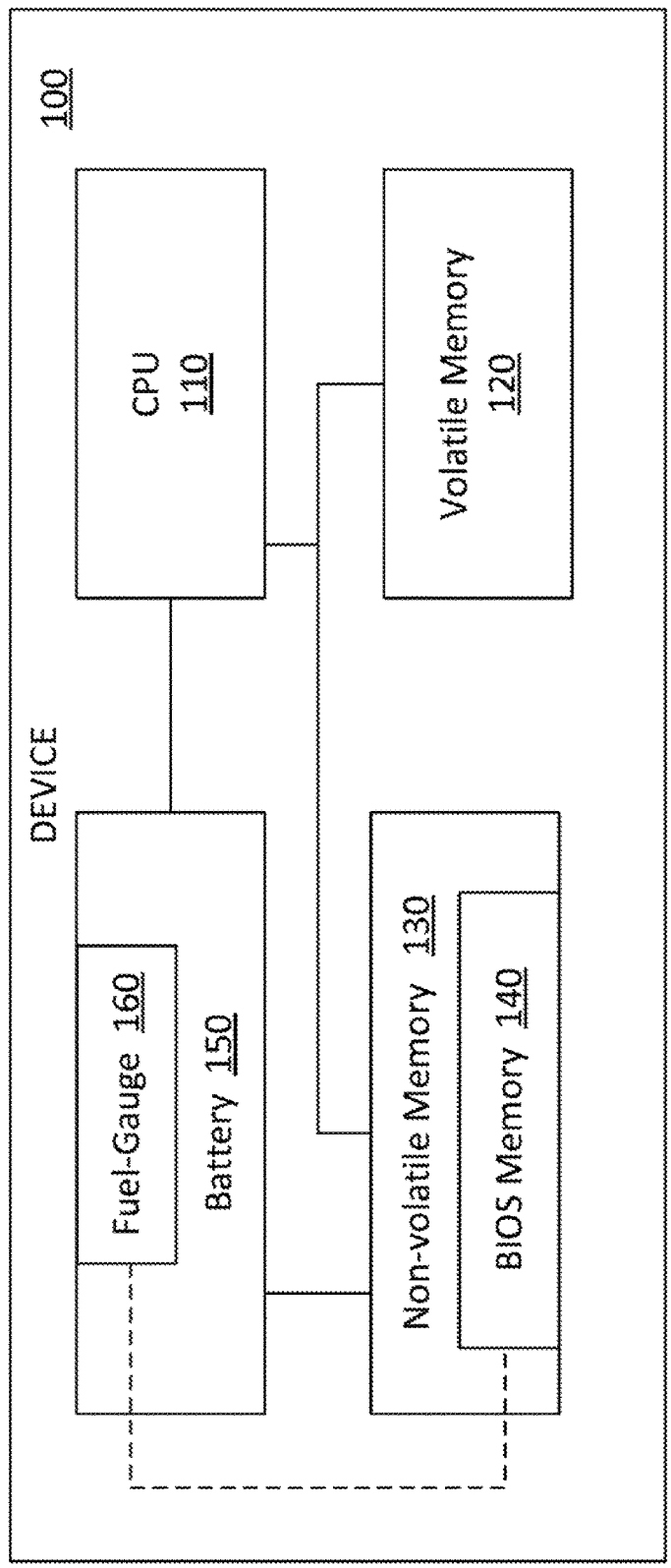
FIG. 1 schematically illustrates an example system having a real-time clock.

Referring now to FIG. 1, an example system having a real-time clock is schematically illustrated. The system may be implemented in a device 100, such as a desktop, laptop, workstation, tablet, smartphone, gaming device, point of sale device, or server. Of course, those skilled in the art will appreciate that the system may be implemented in any of a variety of other electronic devices. The example device 100 of FIG. 1 includes a central processing unit (CPU) 110. In various examples, the CPU 110 may control various operations within the device 100. For example, the CPU 110 may execute instructions from an application stored and/or installed on the device 100.

The example device 100 of FIG. 1 is further provided with a volatile memory 120. In various examples, the volatile memory 120 may be a random access memory (RAM) accessed by the CPU 110 for loading and executing the various applications. The volatile memory 120 may be a static RAM or a dynamic RAM and may be implemented on any of a variety of types of non-transitory storage devices.

A nonvolatile memory 130 is provided on the example device 100 of FIG. 1. The non-volatile memory 130 may be used to store various types of information, including stored data and programs, for example. The non-volatile memory 130 may be any of a variety of types of non-transitory storage devices, such as flash memory chips, for example.

The volatile memory 120 and the non-volatile memory 130 are accessed by the CPU 110. As noted above, the CPU 110 may access the volatile memory 120 (e.g., RAM) to load and access applications while executing instructions associated with the applications, for example. The non-volatile memory 130 may be accessed by the CPU 110 to access data that may be used, for example, by the applications. For example, the iron-volatile memory 130 may store files for editing by a word processing program.

Information stored in the volatile memory 120 may be available during operation of the device 100, but may be lost when the device 100 is shut down. For example, a program loaded into the volatile memory 120 for use by the CPU 100 may require re-starting each time the device 100 is re-booted. By contrast, information in the non-volatile memory 130 may remain stored in the non-volatile memory 130 even if the device 100 is shut down. Thus, information such as documents, pictures, software or other such data may be stored in the non-volatile memory 130.

A part of the non-volatile memory 130 is used to store basic input/output system (BIOS) information. That part is illustrated in FIG. 1 as the BIOS memory 140. The BIOS memory 140 may include data that is needed for the operation of the BIOS of the device 100. Such information may need to be maintained with either no or limited ability to be altered.

The example device 100 of FIG. 1 also includes various power sources. In one example, the device 100 includes the ability to be powered through an external power source (e.g., an alternating current (AC) power adapter). The device 100 may also include a battery 150 for providing power to the device 100 when the external power source is either disconnected or unavailable. When the external power source is connected, the battery may be charged using the external power source.

In the example of FIG. 1, the battery 150 is provided with circuitry for a fuel gauge 160. The fuel gauge 160 in the battery 150 may include circuitry, for example, for measurement of open-circuit voltage. In addition, in some examples, the circuitry may also include measurement of a temperature. Those skilled in the art will appreciate that circuitry for such fuel gauges 160 may take several forms that are contemplated within the scope of the present disclosure.

In various examples of the present disclosure, certain information from the fuel gauge 160 may be provided to the BIOS of the device 110. In FIG. 1, this provision of information is illustrated by the dashed line between the fuel gauge 160 and the BIOS memory 140. In various examples, the information may be provided either directly to the BIOS or indirectly (e.g., through the CPU 110).

Figure 2:
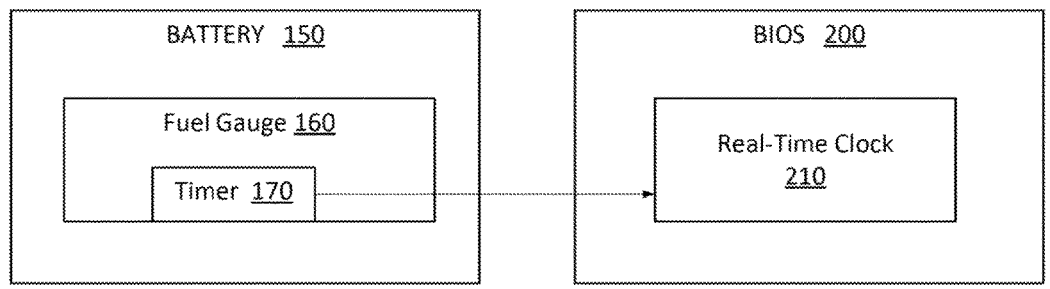
FIG. 2 schematically illustrates an example arrangement for updating a real-time clock.

Referring now to FIG. 2, an example arrangement for updating a real-time clock is schematically illustrated. In the example of FIG. 2, the fuel gauge 160 in the battery 150 is provided with a timer 170. The timer 170 in the fuel gauge 160 may include circuitry that maintains real-time information, such as date and time. In various examples, the timer requires minimal power from the battery and, accordingly, may operate uninterrupted.

The timer 170 may be similar to a real-time clock and, in some examples, may be driven by a clock signal generated from a crystal oscillator. Those skilled in the art will appreciate that various types of timers are possible and are contemplated within the scope of the present disclosure.

Referring again to FIG. 2, a real-time clock 210 of the device 100 may be provided within the BIOS 200 of the device 100. In other examples, the real-time clock 210 may be accessed by the BIOS 200 but may be provided outside the BIOS 200. The BIOS 200 uses the real-time clock 210 for various functions associated with the device 100, the operating system of the device 100 or other programs executed on the device 100.

As with the timer 170 of the battery 150, the real-time clock 210 of the BIOS 200 may take various forms. In one example, the real-time clock 210 includes circuitry driven by a clock signal generated from a crystal oscillator. As referred to herein, a real-time clock 210 is a clock which provides a timing function which supplies timing information to be used as a system time for the device or system in which the real-time clock is implemented. In various examples, the real-time clock provides timing information such as a current time and date. The real-time clock may be used to provide common timing information to multiple sub-systems or applications within the device or system.

In various example of the present disclosure, the real-time clock 210 uses information from the timer 170 in the battery 150. The real-time clock 210 can use the information from the timer 170 to update or synchronize the date and time information. In some examples, unlike real-time clock in conventional systems, the real-time clock 210 ceases operation when the device 100 is shut down. In this regard, while conventional systems include a coin battery to allow continued operation of the real-time clock, in some examples of the present disclosure, no power is provided to the real-time clock 210 when the device 100 is shut down. Thus, the need for an additional power source, such as a coin battery, is eliminated.

Figure 3:
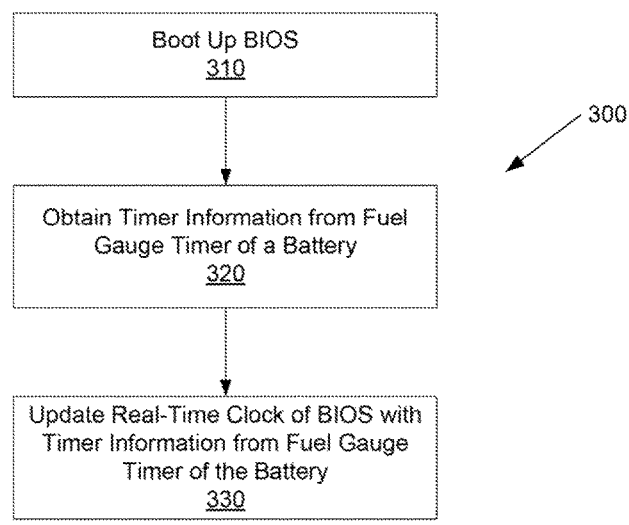
FIG. 3 illustrates an example method for updating a real-time clock.

Referring now to FIG. 3, an example method for updating a real-time clock in a device is illustrated. In accordance with the example method 300, the information from the timer 170 of the battery 150 is used to update the real-time clock 210 upon boot up of the device 100 or the BIOS 200.

Thus, referring again to FIG. 3, the example method begins at block 310, with boot up of the BIOS 200. The BIOS 200 is generally booted up during start up or restarting of the device 100. At boot up of the BIOS 200, the real-time clock may indicate the time and date information associated with the time the device was shut down or some default value.

At block 320, timer information from the timer 170 of the battery 150 (e.g., from the fuel gauge 160 of the battery 150) is obtained. The timer information from the battery 150 may be obtained by, for example, the CPU 110 of the device 100 or directly by the BIOS memory 140 of the device 100. In various examples, the timer information may include the current date and time. Additional information may be provided and is contemplated within the scope of the present disclosure.

At block 330, the timer information from the timer 170 of the battery 150 is used to update the real-time clock associated with the BIOS 200. In this regard, the BIOS 200 may re-start or synchronize the real-time clock 210 with the timer information from the timer 170. Thereafter, the real-time clock 210 can operate normally and may be used by the BIOS 200 and various other aspects of the device 100.

While FIG. 3 illustrates an example in which the time information from the battery is used during boot up of the device 100, other examples may use the timer information at regular intervals during operation of the device 100. For example, at regular intervals, the timer information from the timer 170 of the battery 150 may be obtained and used for verification of the real-time clock 210. In this regard, the timer information from the timer 170 of the battery 150 may be used for synchronization or error correction of the real-time clock 210.

Thus, in various examples, a real-time clock may be provided without the need for a coin battery or any other power source for the real-time clock when the device is shut down. In other examples, a coin battery may be provided for operation of the real-time clock, but timer information from a timer in the device's main battery may be used for synchronization or error correction of the real-time clock.

The various examples set forth herein are described in terms of example block diagrams, flow charts and other illustrations. Those skilled in the art will appreciate that the illustrated examples and their various alternatives can be implemented without confinement to the illustrated examples. For example, block diagrams and their accompanying description should not be construed as mandating a particular architecture or configuration.

What is claimed is:

1. A system, comprising:
   a basic input/output system (BIOS), the BIOS being associated with a real-time clock; and
   a battery having a fuel gauge, the fuel gauge including a timer,
   wherein the BIOS is to utilize timer information from the timer to update the real-time clock.

2. The system of claim 1, wherein the real-time clock is updated using the timer information from timer upon boot up of the BIOS.

3. The system of claim 2, wherein real-time clock is without power before boot up of the BIOS.

4. The system of claim 1, wherein the timer information from the timer includes at least the calendar date and the current time.

5. A method, comprising:
   booting up a basic input/output system (BIOS);
   obtaining timer information from a timer of a battery, the timer being in a fuel gauge of the battery; and
   updating a real-time clock associated with the BIOS using the timer information from the timer of the battery.

6. The method of claim 5, wherein real-time clock is without power before boot up of the BIOS.

7. The method of claim 5, wherein the battery provides power to the BIOS and the real-time clock.

8. The method of claim 5, wherein the timer information from the timer includes at least the calendar date and the current time.

9. An apparatus, comprising:
   a processor; and
   a memory device including computer program code, the memory device and the computer program code, with the processor, to cause the apparatus to:
      obtain timer information from a timer of a fuel gauge of a battery; and
      update a real-time clock associated with a basic input/output system (BIOS) using the timer information from the timer of the fuel gauge of the battery.

10. The apparatus of claim 9, wherein the real-time clock is updated using the timer information from the fuel gauge timer upon boot up of the BIOS.

11. The apparatus of claim 10, wherein real-time clock is without power before boot up of the BIOS.

12. The apparatus of claim 9, wherein real-time clock ceases operation upon shut down of the BIOS.

13. The apparatus of claim 9, wherein the timer information from the fuel gauge timer includes at least the calendar date and the current time.

* * * * *

UNITED STATES PATENT AND TRADEMARK OFFICE
CERTIFICATE OF CORRECTION

PATENT NO. : 10,101,765 B2
APPLICATION NO. : 15/309519
DATED : October 16, 2018
INVENTOR(S) : Jen-Hao Tai et al.

Page 1 of 1

It is certified that error appears in the above-identified patent and that said Letters Patent is hereby corrected as shown below:

On the Title Page

Item (57), Abstract, Line 1, delete "bask" and insert -- basic --, therefor.

Signed and Sealed this
Nineteenth Day of February, 2019

Andrei Iancu
*Director of the United States Patent and Trademark Office*